US011481736B2

(12) United States Patent
Cammack

(10) Patent No.: US 11,481,736 B2
(45) Date of Patent: Oct. 25, 2022

(54) OIL MAINTENANCE MONITORING

(71) Applicant: Toyota Motor North America, Inc., Plano, TX (US)

(72) Inventor: William Daryl Cammack, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 158 days.

(21) Appl. No.: 16/700,339

(22) Filed: Dec. 2, 2019

(65) Prior Publication Data

US 2021/0166198 A1 Jun. 3, 2021

(51) Int. Cl.
G06Q 10/00 (2012.01)
G07C 5/08 (2006.01)
G07C 5/00 (2006.01)

(52) U.S. Cl.
CPC ............. *G06Q 10/20* (2013.01); *G07C 5/008* (2013.01); *G07C 5/0816* (2013.01)

(58) Field of Classification Search
None
See application file for complete search history.

(56) References Cited

U.S. PATENT DOCUMENTS

| 4,694,793 | A | 9/1987 | Kawakita et al. |
| 6,484,127 | B1 | 11/2002 | Langervik |
| 6,508,100 | B2 * | 1/2003 | Berndorfer ........ G01N 33/2888 |
| | | | 73/1.02 |
| 6,526,335 | B1 * | 2/2003 | Treyz .................... H04W 4/029 |
| | | | 701/1 |
| 6,564,126 | B1 | 5/2003 | Lin et al. |
| 6,895,807 | B2 | 5/2005 | Han et al. |
| 7,900,507 | B2 | 3/2011 | Kauffman |
| 7,921,703 | B2 | 4/2011 | Keller et al. |
| 8,707,773 | B2 | 4/2014 | Blossfeld et al. |
| 9,389,215 | B2 | 7/2016 | Von Herzen et al. |
| 9,659,414 | B2 * | 5/2017 | Staley ...................... H04Q 9/00 |
| 2003/0069673 | A1 * | 4/2003 | Hong .................. B60R 25/2081 |
| | | | 701/33.3 |

(Continued)

FOREIGN PATENT DOCUMENTS

| EP | 1283501 A2 * | 5/2002 | ............... G07C 5/08 |
| FR | 2833912 A1 * | 6/2003 | ............. G07C 5/008 |
| JP | 2002132907 A * | 5/2002 | ............. G06F 17/60 |

OTHER PUBLICATIONS

Amiyo Basu, et al., ""Smart sensing" of Oil Degradation and Oil Level Measurements in Gasoline Engines", The Engineering Society for Advancing Mobility Land Sea Air and Space, SAE Technical Papers, Mar. 2000 (Year: 2000).*

(Continued)

*Primary Examiner* — Paul R Fisher
(74) *Attorney, Agent, or Firm* — Oblon, McClelland, Maier & Neustadt, L.L.P.

(57) ABSTRACT

To monitor lubrication maintenance of an automotive vehicle a signal is generated by a sensor that is indicative of exposure of a lubrication system access port through which automotive lubricant is accessed. Performance of a lubrication maintenance operation is determined from the signal and lubrication maintenance information is transmitted externally to the vehicle, where the lubrication maintenance information includes an indication of the performance of the lubrication maintenance operation.

20 Claims, 5 Drawing Sheets

(56) References Cited

U.S. PATENT DOCUMENTS

| | | | | |
|---|---|---|---|---|
| 2004/0093931 | A1* | 5/2004 | Carlstrom | G01N 33/2876 |
| | | | | 73/53.05 |
| 2007/0194801 | A1* | 8/2007 | Hedges | G01N 33/2888 |
| | | | | 324/698 |
| 2010/0122571 | A1* | 5/2010 | Han | F01M 11/10 |
| | | | | 73/54.01 |
| 2010/0214090 | A1* | 8/2010 | Sartini | H04L 67/26 |
| | | | | 340/517 |
| 2013/0203339 | A1* | 8/2013 | Smereka | H04H 20/106 |
| | | | | 455/3.06 |
| 2015/0115983 | A1* | 4/2015 | Potyrailo | G01N 33/2888 |
| | | | | 324/693 |
| 2015/0348058 | A1* | 12/2015 | Liu | G06Q 30/0201 |
| | | | | 701/31.5 |
| 2016/0035150 | A1* | 2/2016 | Barfield, Jr. | G05B 23/0254 |
| | | | | 701/29.3 |

OTHER PUBLICATIONS

Simon S. Wang, Road tests of oil condition sensor and sensing technique, Sensors and Actuators B: Chemical, vol. 73, Issues 2-3, 2001, pp. 106-111, ISSN 0925-4005, https://doi.org/10.1016/S0925-4005(00)00660-2. (Year: 2001).*

Karthikeyan et al., "Elimination of Oil Leak Complaints in RH Cover Parts Assembly", International Journal of Mechanical Engineering and Technology (IJMET) vol. 8, Issue 3, Mar. 2017, pp. 409-418 Article ID: IJMET_08_03_045 (Year: 2017).*

* cited by examiner

OIL MAINTENANCE MONITORING

BACKGROUND

Modern automotive vehicles often require substantial financial outlays and may represent a large part of a household or company budget. Regular maintenance is a key practice for extending the life of an automotive vehicle, as is prompt attention to indicators of vehicle malfunction or diminished vehicle performance. One essential maintenance practice is to regularly change the engine lubricant, as its quality diminishes with use at high engine temperatures. Typically, the lubricant changing interval is a function of mileage (e.g., 3,000 miles) or time in service (e.g., three months). Traditionally, it has fallen on the vehicle operator or lubrication technician to record when the last lubrication change occurred and when the next oil change should be performed.

U.S. Pat. No. 9,659,414 details a lubricant sensor connected to a filler pan plug. The lubricant sensor sends wireless signals to the vehicle central processor unit which can display the information to the vehicle display unit. Lubricant change occurrences are recognized, e.g., the lubricant sensor is able to recognize an lubrication change event and communicate to the vehicle central processor unit for updating or prompting the vehicle operator that a lubrication change was performed. The lubricant change detection feature provides a means by which the lubricant life monitor on a vehicle can be automatically reset rather than requiring vehicle operator input.

Such an automated process relieves the vehicle owner from manual recordkeeping and, in the process, generates oil maintenance information that remains with the vehicle. Research and development efforts utilizing such oil maintenance information in contexts wider than localized to the vehicle are ongoing.

SUMMARY

To monitor lubrication maintenance of an automotive vehicle a signal is generated by a sensor that is indicative of exposure of a lubrication system access port through which automotive lubricant is accessed. Performance of a lubrication maintenance operation is determined from the signal and lubrication maintenance information is transmitted externally to the vehicle, where the lubrication maintenance information includes an indication of the performance of the lubrication maintenance operation.

DETAILED DESCRIPTION

Figure 1:
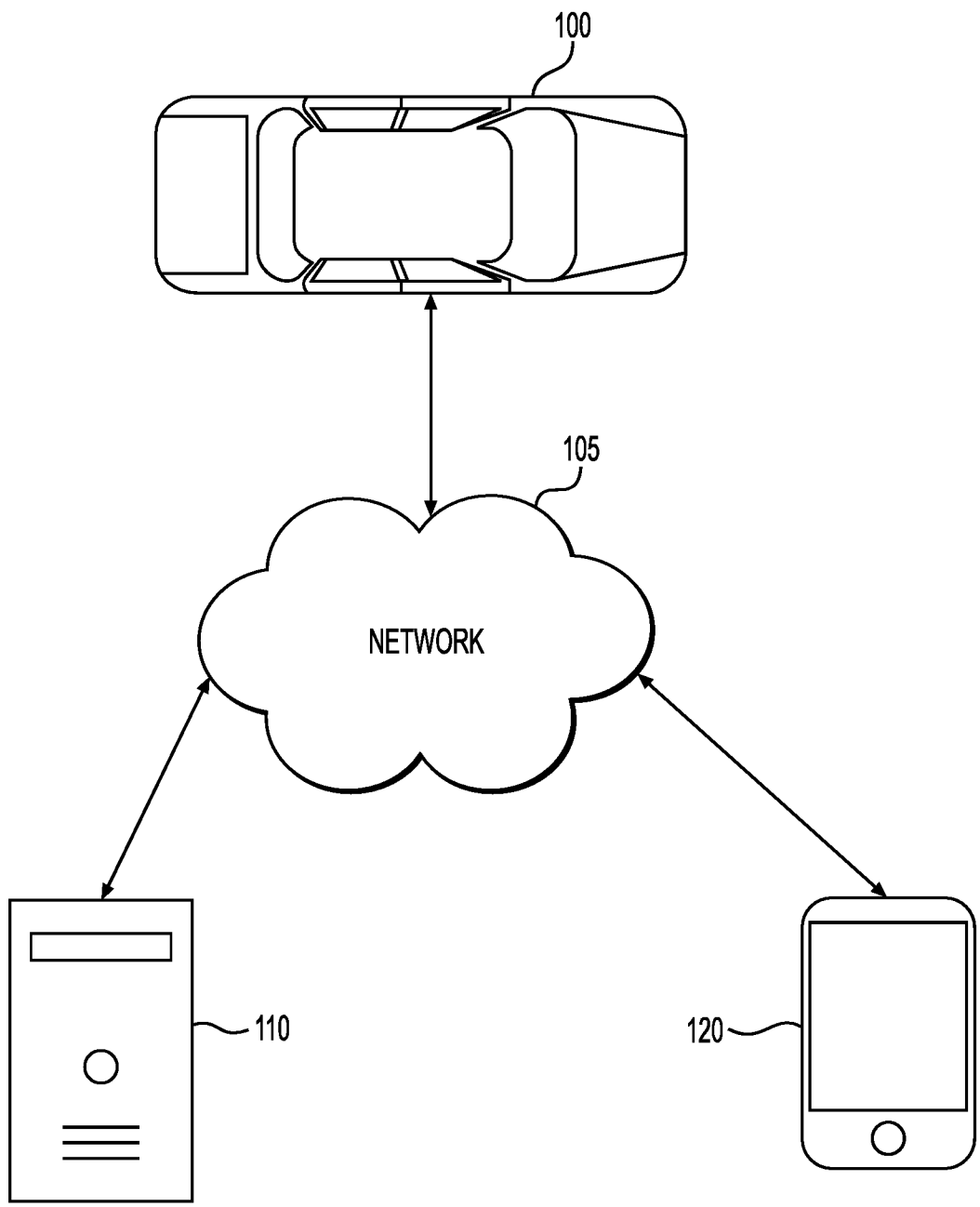
FIG. 1 is diagram of an example environment in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is a diagram of an example environment in which the present inventive concept can be embodied. As is illustrated, an automotive vehicle 100 (or, simply vehicle 100) may be communicatively coupled to one or more server devices 110 and/or one or more communication devices 120 through a communications network 105. As can be appreciated, communications network 105 can be a public network, such as the Internet, or a private network such as a LAN or WAN network, or any combination thereof and can also include PSTN or ISDN sub-networks. Network 105 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

Server 110 may be implemented on hardware and software resources of an entity to interoperate with vehicle 100 and communication device 120 over network 105. The entity, such as a car dealership or automobile manufacturer, may collect and analyze data from not only vehicle 100, but from a large number of other selected vehicles as well. In addition to data collection and analysis functionality, server 110 may further implement an outwardly facing interface or portal through which external devices, such as communication device 120, may access services and data provided by the entity. These and other features of server 110 are discussed below.

Communication device 120 may be implemented on hardware and software resources of an entity to interoperate with vehicle 100 and server 110. Communication device 120 may be operated by a vehicle owner or operator to interact with vehicle systems, such as those described below. Communication device 120 may be implemented through various technologies, such as cellular phones, smartphones, tablet computers, laptop computers, desktop computers and the like.

Figure 2:
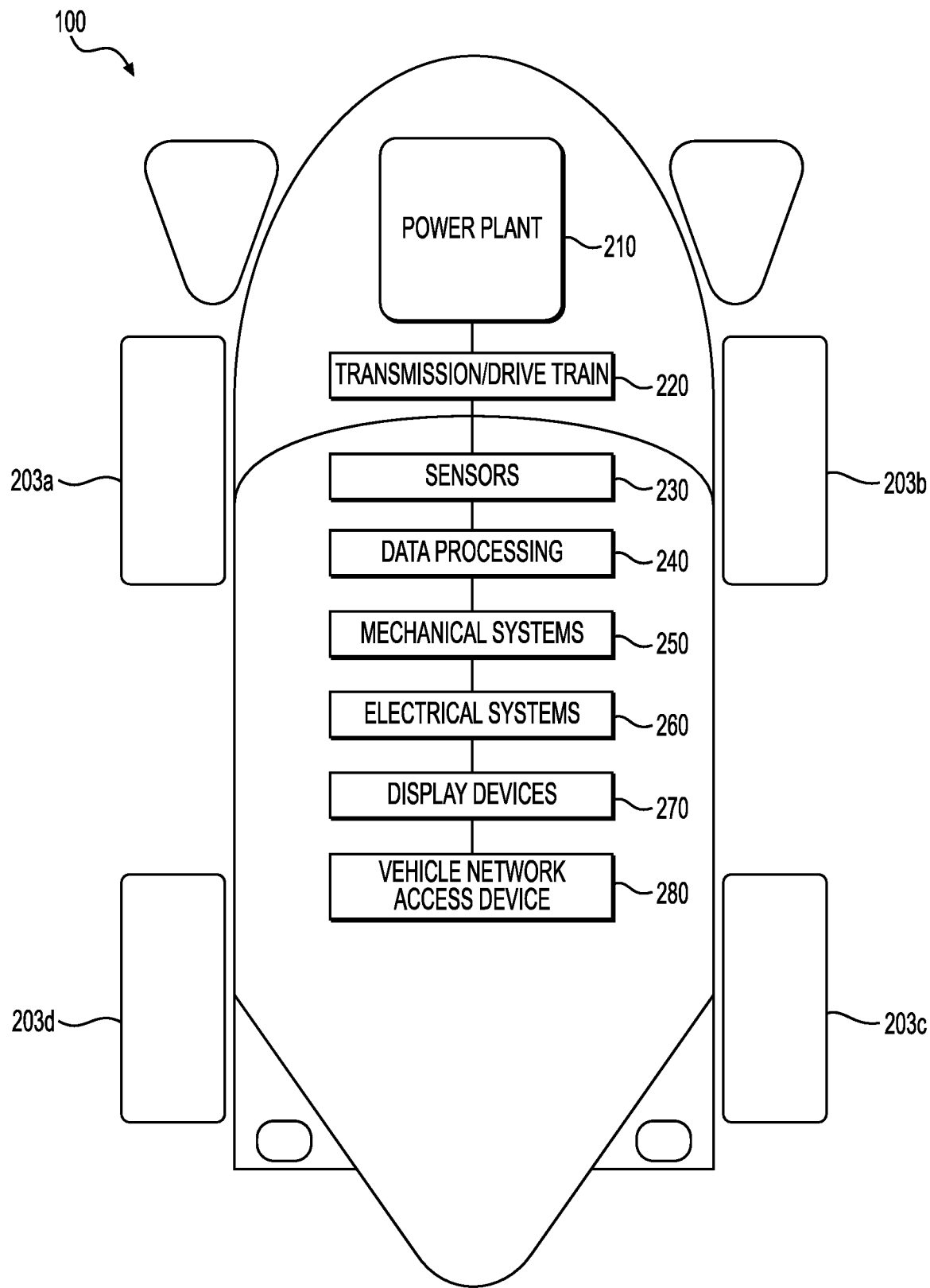
FIG. 2 is a schematic block diagram of an example vehicle embodying the present inventive concept.

FIG. 2 is a schematic block diagram of an example vehicle 100 embodying the principles described in this disclosure. FIG. 2 presents a set of vehicle systems in block form, where individual blocks in the figure represent physical manifestations of vehicle systems that include mechanisms described in more detail below. The systems represented in FIG. 2 are one set that can realize a fully functional automotive vehicle on which the present invention can be embodied.

Although the embodiment of FIG. 2 is illustrated and described as a road vehicle, upon review of this disclosure the skilled artisan will recognize how the principles of this disclosure can be applied in vehicles of other propulsion modes, e.g., aircraft, watercraft, hovercraft, etc. When vehicle 100 is embodied as a road vehicle, propulsion is achieved through a frictional engagement between wheels 203a-203d, representatively referred to herein as wheel(s) 203, and a road surface. Torque on wheels 203 may be provided by a power plant 210 that converts energy (internal combustion, electromotive) into rotational mechanical force. Wheels 203 are mechanically coupled to a vehicle body 205, in which a vehicle occupant would ride and/or cargo would be carried. Mechanical coupling between wheels 203 and vehicle body 205 may be implemented any number of ways, such as by use of a conventional vehicle chassis (not illustrated) and/or a conventional vehicle suspension system (not illustrated).

Vehicle 200 may be self-contained to the extent that it can carry a vehicle occupant (and/or cargo) along a trajectory, typically hundreds of miles long, without having to replenish its energy source (combustible fuel refill, battery recharge or both). Power plant 210 derives power from an energy source, such as gasoline and/or a battery, and applies a rotational force to wheels 203 through a transmission/drive train 220. These principles are well known and can be carried out by conventional means, unless otherwise indicated herein.

The descriptions herein are primarily directed to the lubrication system of power plant 210. Typically, the lubricant used in such power plants is referred to as "motor oil," or simply "oil," even when the product is entirely synthetic. The terms "oil" and "lubricant" are used herein interchangeably to refer to any lubricant in a system that requires that lubricant to be changed periodically as part of regular maintenance.

Distributed throughout vehicle 100 are numerous sensors 230; each generating a signal in response to a physical stimulus, e.g., pressure, temperature, position, voltage, current, velocity, torque, etc. Through such electrical signals, the state of vehicle 100 is obtained. As used herein, a vehicle state is defined by a selected (and often extensive) set of parameters associated with vehicle functionality. This includes base parameters such as the vehicle's speed, engine output, etc., but also includes parameters of other vehicle features, such as when the headlights are on and/or turn signals activated. Vehicle state may also include such parameters as cabin temperature and entertainment systems settings. Sensors 230 include the types and numbers of sensors necessary to determine the vehicle state at the granularity of information envisioned by a designer. To achieve various benefits of the inventions, sensors 230 would include at least those described in the example embodiments below.

Example data processing component 240 operates on, among other data, sensor data obtained from the aforementioned sensor signals to determine vehicle state information, which may be conveyed to a vehicle occupant through indicators or user interfaces implemented in vehicle 100. For example, when vehicle 100 is in a maintenance state (e.g., lubrication maintenance), embodiments of the invention may indicate such through an iconic dashboard indicator or dashboard message displayed on display devices 270, or any suitable way of providing the state information to an end user, be that the driver or other occupant, a remote entity operating server 110 and/or operator of communication device 120. Additionally, the vehicle state may compel action by a vehicle control unit, such as to limit vehicle operation based on state information.

Vehicle 100 may include mechanical systems 250 that implement various mechanical functions of a fully functional automotive vehicle. Mechanical systems 250 may include convention controls such as steering, accelerating, and braking controls, as well as other mechanically-operated user controls. Mechanical systems 250 may include environmental and safety mechanisms. The present invention can be embodied in a vehicle, such as vehicle 100, having any number of conventional mechanisms in mechanical systems 250 that realize a fully functional automotive vehicle.

Vehicle 100 may include electrical systems 260 that implement various electrical/electronic functions. Electrical systems 260 comprise multiple electrical/electronic components, e.g., lamps, motors, solenoids, switches, electrical control circuits, entertainment systems, etc. typically interconnected by one or more wiring harnesses. Additionally, modern vehicles make use of processor circuits to implement monitor and control mechanisms. Thus, in certain embodiments, electrical systems 260 may include central processing circuitry that implements centralized control of vehicle 100. Electrical systems 260 may include those electrical/electronic components necessary to realize a fully functional automotive vehicle. Those having skill in the art will recognize many different electrical/electronic components and circuits that can be implemented in various embodiments without departing from the principles described in this disclosure.

Display devices 270 may implement user interfaces that convey varied information to a vehicle operator and, in certain embodiments, afford vehicle control, such as through a touchscreen. Display devices 270 may be distributed throughout vehicle 100, such as on the dashboard or driver console and on the backs of cockpit seats for use by rear-seat occupants. Vehicle 100 may include display devices of different types, including individual lamps or indicators and high resolution LED display devices known in the art. The types and number of display devices in display devices 270 will vary by vehicle design.

In certain implementations, vehicle 100 may include a vehicle network access device 280 by which vehicle 200 communicates with and is accessed by external devices, such as communication device 120 and server 110 illustrated in FIG. 1. Vehicle network access device 280 may include suitable communication circuitry to convey raw and processed information to external devices for purposes of maintenance, diagnostics, recordkeeping, and so on. A detailed example of such arrangement is provided below.

Figure 3:
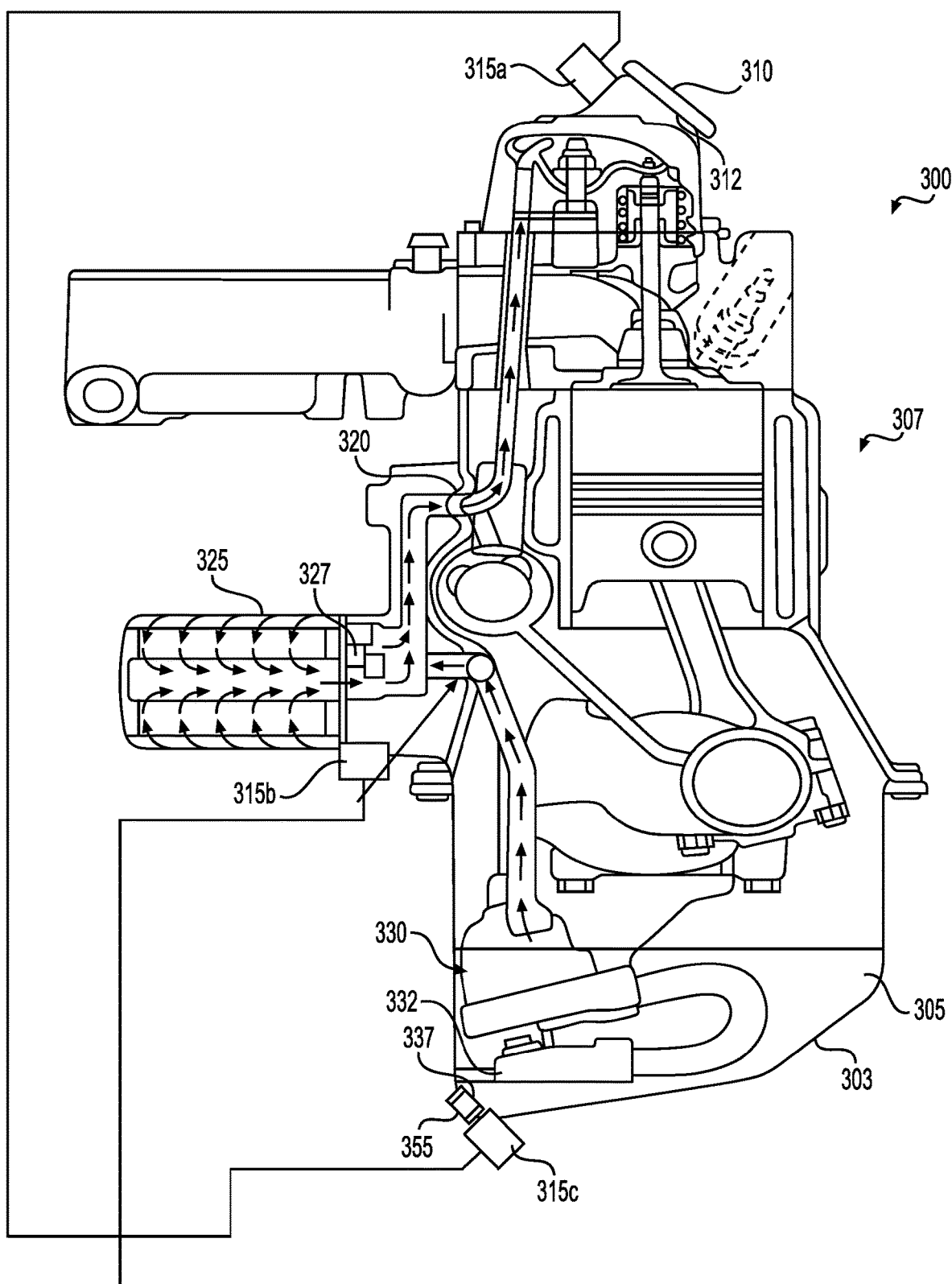
FIG. 3 is a diagram of an example automotive lubrication system by which the present inventive concept can be embodied.

FIG. 3 is a diagram of an example automotive lubrication system 300 by which the present invention can be embodied. Briefly and as is known, a quantity of lubricant 305 is stored in an oil sump 303 of an engine 307 (internal combustion engine illustrated) and is drawn through a pickup screen 332. The lubricant 305 is motivated through an oil filter 325 and through various channels 320 of engine 307 by a pump 330. Lubricant 305 is delivered to the various machine parts of engine 307 via channels 320.

Replacement of lubricant 305 may be achieved by first draining old lubricant out of engine 307 through an oil drain port 337 regularly occupied by an oil drain plug 335. Subsequently, engine 307 may be refilled with new lubricant through a oil fill port 312 regularly occupied by an oil fill cap 310. At the time of lubricant replacement, it is typical to replace oil filter 325 as well. Oil filter 325 occupies an oil filter port 327. A typical oil change involves removal and reattachment of fill cap 310, drain plug 335 and oil filter 325 from their respective oil system access ports, which, as used herein, refers to those ports (e.g., drain port 337, fill port 312 and oil filter port 327) in which motor oil internal to engine 307 may be accessed.

In accordance with the inventive concept, one or more of fill cap 310, drain plug 335 and oil filter 325 is coupled to a corresponding sensor 315a-315c, representatively referred to herein as sensor(s) 315, that detects when the sensed item, referred to herein as a target item, has been removed and/or replaced. As illustrated in the figure, fill cap 310 may be coupled to and the target item of a sensor 315a, oil filter 325 may be coupled to and the target item of a sensor 315b and drain plug 335 may be coupled to and the target item of a sensor 315c. Such coupling between a sensor and its target item to indicate presence or absence of the target item (fill cap 310, drain plug 335 and oil filter 325) may be achieved any number of ways. For example, a sensor 315 may include a switch (not illustrated) that is in one position when the target item is in place and is in another position when the target item has been removed. In one embodiment, a binary electrical signal indicates whether the switch is electrically-open or electrically-closed and the presence or absence of the target item can be inferred from the state of the binary electrical signal. It is to be understood that sensors 315 may be optical or magnetic switches as well.

Figure 4:
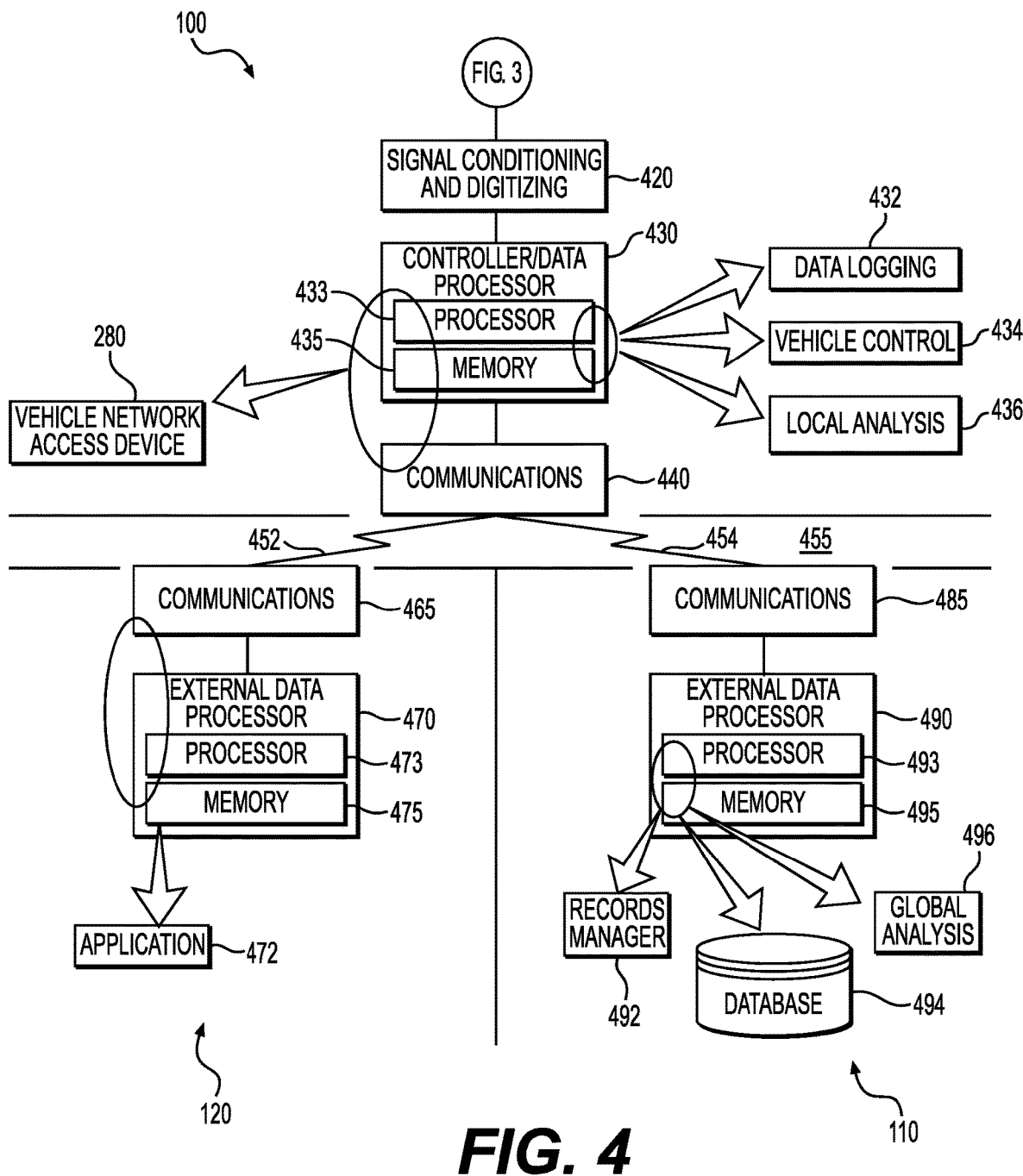
FIG. 4 is a schematic block diagram of an example system configuration by which the present inventive concept can be embodied.

FIG. 4 is a schematic block diagram of an example system configuration by which the present inventive concept can be embodied. The principle components of the system described in FIG. 1, vehicle 100, communications device 120 and server 110, are illustrated at a different level of abstraction in FIG. 4, but represent the same systems as described above. As indicated in the figure, each of sensors 315 illustrated in FIG. 3 may be communicatively coupled to a signal conditioning and digitizing component 420 of FIG. 4.

In FIG. 4, vehicle 100 may be communicatively coupled with a communication device 120 and a server device 110 through communications links 452 and 454, respectively. Communications links 452 and 454 may be constructed in one or more media 455, such as would be underlying communications network 105 illustrated in FIG. 1. To that end, each of vehicle 100, communications device 120 and server 110 comprises communications components 440, 465 and 485, respectively. Communications components 440, 465 and 485 comprise circuitry suitable for constructing communication links 452 and 454 according to corresponding communication procedures and protocols. Those having skill in the communications arts will recognize numerous techniques by which such communications may be achieved without departing from the inventive concept disclosed herein.

Additionally, each of vehicle 100, communication device 120 and server 110 comprises computer resources at controller/data processor 430, external data processor 470 and external data processor 490, respectively. Each of these processor components comprise processor and memory resources: controller/data processor 430 comprises one or more processors 433 and memory 435; external data processor 470 comprises one or more processors 473 and memory 475; and external data processor 490 comprises one or more processors 493 and memory 495. Each of the processors may be implemented on microprocessors, microcontrollers, digital signal processors, field programmable gate arrays, application specific integrated circuits, programmable logic devices, or using discrete logic circuits, as one of ordinary skill in the art would recognize. The memories may be implemented on random access memory circuits, read-only memory circuits, volatile memory circuits, persistent memory circuits, etc. including hard disk drives, optical drives, flash drives, memory integrated circuits and other forms known to skilled artisans.

As described above, one or more lubrication system access port sensors 315 from FIG. 3 may be suitably coupled to target lubrication system access ports (oil drain port 337, oil fill port 312 and oil filter port 327) so as to detect when such access ports have been exposed for automotive maintenance. The electrical signal from sensors 315 may be conditioned (filtered, amplified, etc.) and, in certain embodiments, digitized (sampled) by signal conditioning and digitizing component 420 into computer data that can be operated on by computer resources of vehicle 100. These data will be referred to herein as sensor data and may be used to indicate whether an oil system access port has been exposed, thus indicating the occurrence of a lubrication maintenance event.

As illustrated in FIG. 4, computer resources of vehicle 100 may realize a data logging component 432, by which lubrication maintenance events, among other things, are timestamped and stored in data records in onboard memory 435. In certain implementations, these logged data records are transmitted to one or more external entities, such as communication device 120 and/or server 110. A vehicle identifier may be stored in memory 435 that can be transmitted with the logged data records so as to uniquely identify the dataset at the receiving entity. However, other implementations may omit transmitting all of the logged data records and may instead transmit indications of selected events, such as a lubrication maintenance event.

Computer resources of vehicle 100 may implement a vehicle control component 434 by which vehicle systems are centrally controlled. Such control includes systems monitoring with responsive engine control, environmental (emissions) control, suspension control, cabin climate control and other automotive control functions known to skilled artisans. Additionally, vehicle control component 434 may be responsive to lubrication maintenance events. For example, vehicle control component 434 may prevent engine operation if, for example, oil plug 335 and/or oil filter 325 is removed.

Computer resources of vehicle 100 may further implement a local analysis component 336. Local analysis component 436 may analyze data derived from various sensors of vehicle 100 to determine a state of vehicle 100. The state of vehicle 100 may be provided to vehicle control component 434 and a corresponding action or response may be compelled thereby. For example, the state of the vehicle may include an oil change date and time indication, and/or a countdown timer value that indicates a current time to next oil change. The timers that imprint these values on the vehicle state may be realized by the processor resources of vehicle 100. The determination of whether lubrication maintenance events occur may be a function realized by processor instructions stored in memory 435 and executed by processor 433.

Vehicle network access device 280 may be implemented on computer resources of controller/data processor component 430 and communication resources of communications component 440. When so configured, embodiments of the principles described herein can participate in a cloud computing environment and other coordinated communications via communication links 452 and 454. In one embodiment, the state of vehicle 100 includes an indication that a lubrication maintenance procedure has been performed and/or an indication of a time interval within which the next lubrication maintenance procedure should be performed. The state of the vehicle may be conveyed to communications device 120 and server 110.

Application 472 on communication device 110 allows monitoring and control of vehicle 100 via communications link 452. In certain implementations, various features of vehicle 100 are remotely controllable through application 472. Application 472 may send messages to and receive messages from vehicle control component 434 through vehicle network access device 280 via, for example, a user interface portion of application 472. Such control can remotely operate features such as remote start, lighting, etc., and may receive vehicle state information. Application 472 may comprise processor instructions stored in memory 475 and executed by processor 473 to communicate using communications component 465 with vehicle 100 and/or server 110.

Server 110 may include persistent storage on which a database 494 is constructed. In one embodiment, application 472 may access database 494 in a limited way through records manager component 492, such as to maintain or otherwise view records on one's own vehicle. Additionally, database 494 may be updated with suitably formatted messages from vehicle 100. For example, records manager component 492 may receive a message from vehicle 100 that a lubrication maintenance procedure has been performed and a timestamp indicating when such lubrication maintenance procedure has been performed. Additionally or alternatively, records manager component 492 may receive an indication as to within what time the next lubrication maintenance procedure should be performed.

In one example embodiment, power plant 210 is an internal combustion engine. One or more of sensors 315 may be a detection switch that detects whether a corresponding one of oil fill cap 310, oil filter 325 or oil drain plug 335 has been removed. The electrical signal generated by sensor 315 may be sampled, such as by signal conditioning and digitizing component 420, into sensor data. These sensor data may be provided to local analysis component 436, whereby the sensor data are processed to determine whether a lubrication maintenance event has occurred. In certain embodiments, lubrication maintenance events may be logged by data logging component 432 and stored in data records of memory 435. In response to a lubrication maintenance event, e.g., one of oil fill cap 310, oil filter 325 or oil drain plug 335 being removed, vehicle 100 may transition into a lubrication maintenance state. In this state, vehicle control component 434 may compel lighting an indicator and/or displaying a message on display devices 270. Vehicle control component 434 may further transmit an indication of the occurrence of the lubrication maintenance event to communication device 120 and/or to server 110. Additionally or alternatively, vehicle control component 434 may transmit an indication of the time (or mileage) within which the next lubrication maintenance procedure should be performed.

In one embodiment, vehicle network access device 280 transmits the indication of a lubrication maintenance event to server 110. The data may be transmitted in association with a unique identifier, such as the vehicle identification number (VIN). The indication of the lubrication maintenance event may be added to records stored in database 494 via records manager component 492 along with the date and time as recorded by data logging component 432. In certain embodiments, maintenance records may be kept online in database 494, which may be accessed by application 472 of communication device 120.

Database 494 may contain the records of numerous vehicles, such as would be of interest to vehicle dealers and/or manufacturers. Analysis of such records may be performed by global analysis component 495, which may identify whether regular lubrication maintenance is performed. This information may be used to determine whether a vehicle warranty is voided for lack of proper maintenance. Additionally, global analysis component 495 may analyze the data in database 494 to determine what effect oil change frequency has on engine life. The correlation between oil change frequency and engine life may be used by designers to specify lubrication maintenance procedures for future automobile models. For example, global analysis component 495 may consider the costs and inconvenience of lubrication maintenance against improved engine life with more frequent oil changes to determine an optimum oil change frequency based on big data contained in database 494.

In certain embodiments, vehicle network access device 280 may transmit the indication of lubrication maintenance event and/or the lubrication maintenance due date to communication device 120. Such transmission may occur over the Internet and displayed on communication device 120 through application 472. Alternatively or additionally, the transmission may occur via a text message via cellular technology, should vehicle 100 be so equipped. Other notification techniques, such as email, may be used in embodiments as well.

Figure 5:
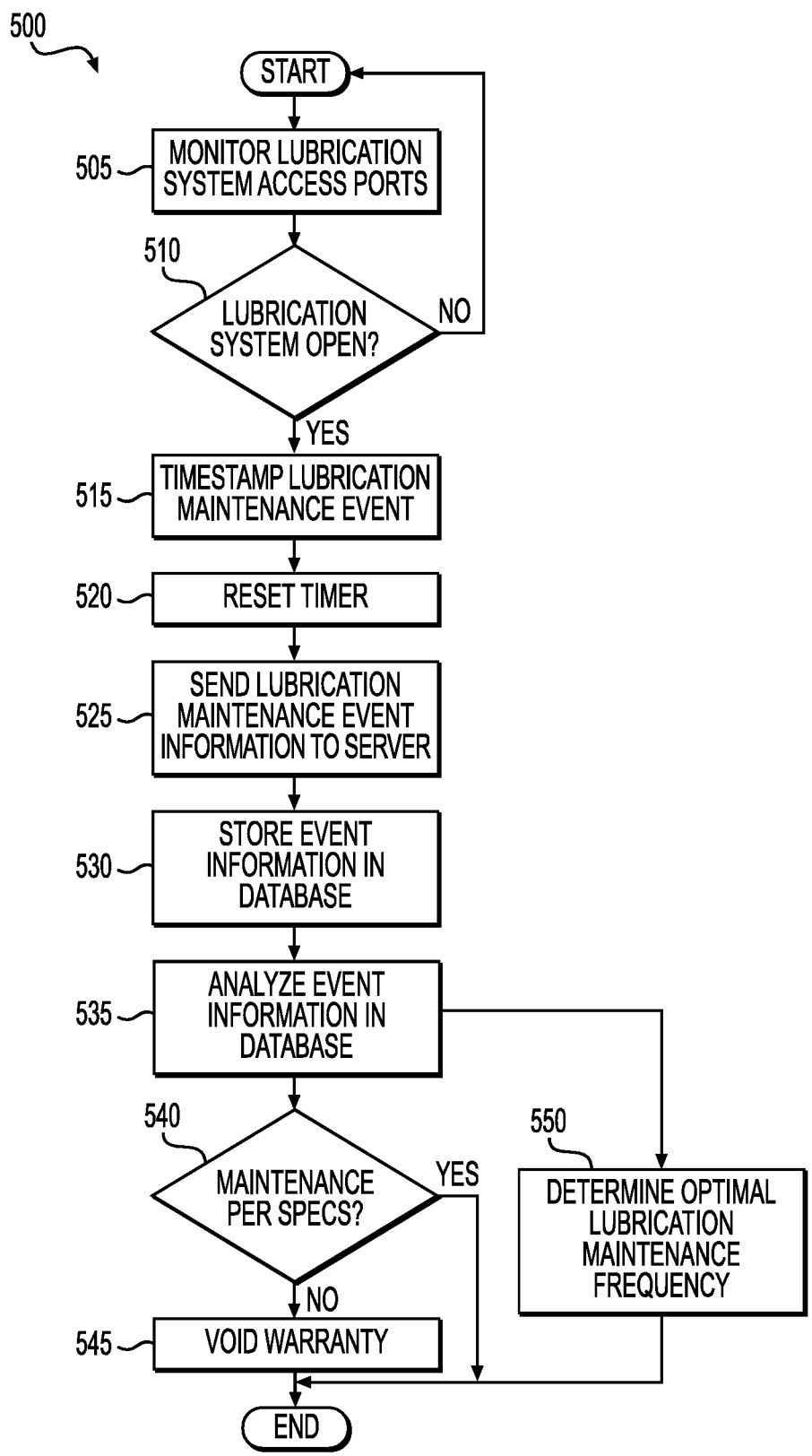
FIG. 5 is a flow diagram illustrating an example oil maintenance monitoring process by which the present inventive concept may be embodied.

FIG. 5 is a flow diagram illustrating an example oil maintenance monitoring process 500 by which the present invention may be embodied. In operation 505, one or more lubrication system access ports are monitored, such as by sensors described above. In operation 510, it is determined whether the lubrication system has been opened or otherwise exposed, such as by one of the aforementioned sensors changing state to indicate that one of oil plug 335, oil filter 325 or oil fill cap 310 has been removed. If so, process 500 may transition to operation 515, whereby a lubrication maintenance event is timestamped. In operation 520, a timer is reset that counts down to a next lubrication maintenance cycle, i.e., the next time the lubrication needs to be changed. In operation 525, lubrication maintenance event information may be sent to a server. Such lubrication maintenance event information may include a vehicle identifier, the time stamp of the lubrication maintenance event as well as an indication of the next lubrication maintenance cycle. In operation 530, such lubrication maintenance information may be stored in a database implemented by the server and, in operation 535, the information in the database is analyzed.

In operation 540, it is determined whether maintenance has been performed according to the manufacturer's specifications. If not, process 500 may transition to operation 545 by which the vehicle warranty may be voided for lack of proper maintenance. Typically, such determination is made at a telematics hub, such as server 110, that can convey the voiding of the warranty to relevant parties, e.g., third party warranty providers.

In operation 550, a lubrication maintenance frequency is determined from analyzing the stored lubrication maintenance information, as well as other information stored in the database. Such other information may include an indication of other vehicle maintenance procedures indicative of engine problems, particularly those performed due to lack of lubrication maintenance.

As will be appreciated by one skilled in the art, aspects of the present invention may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present invention may take the form of a computer program product embodied in one or more computer readable medium(s) having computer readable program code embodied thereon.

Computer program code for carrying out operations for aspects of the disclosure may be written in any combination of one or more programming languages, e.g., an object oriented programming language such as Java, Smalltalk, C++ or the like, or a conventional procedural programming language, such as the "C" programming language or similar programming languages.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, method and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the inventive concept and the practical application, and to enable others of ordinary skill in the art to understand the inventive concept for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method comprising:
generating, by a sensor of an automotive vehicle, a signal indicative of exposure of a lubrication system access port through which automotive lubricant is accessed;
determining, by a processor of the vehicle, that a lubrication maintenance operation is performed from the signal;
preventing, by the processor of the vehicle, operation of an engine of the vehicle while the lubrication system access port is exposed based upon the signal;
transmitting, by a communication component of the vehicle, lubrication maintenance information externally to the vehicle over a communications network, the lubrication maintenance information including an indication of the performance of the lubrication maintenance operation;
receiving, by a communication component of a server, the lubrication maintenance information from the vehicle and lubrication maintenance information from a plurality of other automotive vehicles over the communications network;
storing, by a database of the server, the lubrication maintenance information of the vehicle and the lubrication maintenance information of the plurality of other vehicles; and
specifying, by a processor of the server, lubrication maintenance procedures for design of future automotive vehicles based upon big data including the lubrication maintenance information received from the vehicle and the lubrication maintenance information received from the plurality of other vehicles.

2. The method of claim 1, further comprising including an indication of a next lubrication maintenance time in the transmitted lubrication maintenance information.

3. The method of claim 1, further comprising transmitting the lubrication maintenance information to a mobile communication device over the communications network.

4. The method of claim 1, further comprising determining, by the processor of the server, whether lubrication maintenance has been performed according to a lubrication maintenance specification of the vehicle.

5. The method of claim 1, further comprising specifying, by the processor of the server, the lubrication maintenance procedures for design of the future automotive vehicles by correlating a lubrication change frequency and an engine life of the vehicle and the plurality of the other vehicles based upon the lubrication maintenance information received from the vehicle and the lubrication maintenance information received from the plurality of other vehicles.

6. The method of claim 1, further comprising determining, by the processor of the server, an optimum lubrication change frequency based upon the lubrication maintenance information received from the vehicle and the lubrication maintenance information received from the plurality of other vehicles.

7. A system comprising:
an apparatus configured to monitor lubricant maintenance of an automotive vehicle including:
a sensor that generates a signal indicative of exposure of a lubrication system access port through which automotive lubricant is accessed;
a processor configured to:
determine that a lubrication maintenance operation is performed from the signal, and
prevent operation of an engine of the vehicle while the lubrication system access port is exposed based upon the signal; and
a communication component configured to transmit lubrication maintenance information externally to the vehicle over a communications network, the lubrication maintenance information including an indication of the performance of the lubrication maintenance operation, and
a server including:
a communication component configured to receive the lubrication maintenance information from the vehicle and lubrication maintenance information from a plurality of other automotive vehicles over the communications network;
a database configured to store the lubrication maintenance information of the vehicle and the lubrication maintenance information of the plurality of other vehicles; and
a processor configured to specify lubrication maintenance procedures for design of future automotive vehicles based upon big data including the lubrication maintenance information received from the vehicle and the lubrication maintenance information received from the plurality of other vehicles.

8. The system of claim 1, wherein the lubrication maintenance information includes an indication of a next lubrication maintenance time.

9. The system of claim 1, wherein the lubrication maintenance information is transmitted to a mobile communication device over a cellular network as a text message.

10. The system of claim 1, wherein the lubrication maintenance information is transmitted to a mobile communication device over the communications network as an email message.

11. The system of claim 1, wherein the processor of the server is configured to determine whether lubrication maintenance has been performed according to a lubrication maintenance specification of the vehicle.

12. The system of claim 1, wherein the processor of the server is configured to specify the lubrication maintenance procedures for design of the future automotive vehicles by correlating a lubrication change frequency and an engine life of the vehicle and the plurality of the other vehicles based upon the lubrication maintenance information received from the vehicle and the lubrication maintenance information received from the plurality of other vehicles.

13. The system of claim 1, wherein the processor of the server is configured to determine an optimum lubrication change frequency based upon the lubrication maintenance information received from the vehicle and the lubrication maintenance information received from the plurality of other vehicles.

14. A system comprising:
an automotive vehicle including:
a sensor that generates a signal indicative of exposure of a lubrication system access port through which automotive lubricant is accessed;
a processor configured to:
determine that a lubrication maintenance operation is performed from the signal, and
prevent operation of an engine of the vehicle while the lubrication system access port is exposed based upon the signal; and
a communication component configured to transmit lubrication maintenance information externally to the vehicle over a communications network, the lubrication maintenance information including an indication of the performance of the lubrication maintenance operation, and
a server including:
a communication component configured to receive the lubrication maintenance information from the vehicle and lubrication maintenance information from a plurality of other automotive vehicles over the communications network;
a database configured to store the lubrication maintenance information of the vehicle and the lubrication maintenance information of the plurality of other vehicles; and
a processor configured to specify lubrication maintenance procedures for design of future automotive vehicles based upon big data including the lubrication maintenance information received from the vehicle and the lubrication maintenance information received from the plurality of other vehicles.

15. The system of claim 14, wherein the lubrication maintenance information includes an indication of a next lubrication maintenance time.

16. The system of claim 14, wherein the lubrication maintenance information is transmitted to a mobile communication device over a cellular network as a text message.

17. The automotive vehicle of claim 14, wherein the lubrication maintenance information is transmitted to a mobile communication device over the communications network as an email message.

18. The system of claim 14, wherein the processor of the server is configured to determine whether lubrication maintenance has been performed according to a lubrication maintenance specification of the vehicle.

19. The system of claim 14, wherein the processor of the server is configured to specify the lubrication maintenance procedures for design of the future automotive vehicles by correlating a lubrication change frequency and an engine life of the vehicle and the plurality of the other vehicles based upon the lubrication maintenance information received from the vehicle and the lubrication maintenance information received from the plurality of other vehicles.

20. The system of claim 14, wherein the processor of the server is configured to determine an optimum lubrication change frequency based upon the lubrication maintenance information received from the vehicle and the lubrication maintenance information received from the plurality of other vehicles.

* * * * *